United States Patent
Paithane et al.

(10) Patent No.: US 9,536,091 B2
(45) Date of Patent: Jan. 3, 2017

(54) SYSTEM AND METHOD FOR DETECTING TIME-BOMB MALWARE

(71) Applicant: FireEye, Inc., Milpitas, CA (US)

(72) Inventors: Sushant Paithane, Sunnyvale, CA (US); Michael Vincent, Sunnyvale, CA (US); Sai Vashisht, Union City, CA (US); Darien Kindlund, Great Falls, VA (US)

(73) Assignee: FireEye, Inc., Milpitas, CA (US)

( * ) Notice: Subject to any disclaimer, the term of this patent is extended or adjusted under 35 U.S.C. 154(b) by 19 days.

(21) Appl. No.: 13/925,737

(22) Filed: Jun. 24, 2013

(65) Prior Publication Data

US 2014/0380474 A1 Dec. 25, 2014

(51) Int. Cl.
G06F 21/55 (2013.01)
G06F 21/56 (2013.01)
H04L 29/06 (2006.01)

(52) U.S. Cl.
CPC ........... G06F 21/566 (2013.01); G06F 21/567 (2013.01); *G06F 21/554* (2013.01); *H04L 63/145* (2013.01); *H04L 63/1416* (2013.01)

(58) Field of Classification Search
CPC ........ G06F 21/566; G06F 21/56; G06F 21/53; G06F 21/554; H04L 63/145; H04L 63/1416
See application file for complete search history.

(56) References Cited

U.S. PATENT DOCUMENTS

| | | | |
|---|---|---|---|
| 4,292,580 A | 9/1981 | Ott et al. | |
| 5,175,732 A | 12/1992 | Hendel et al. | |
| 5,440,723 A | 8/1995 | Arnold et al. | |
| 5,657,473 A | 8/1997 | Killean et al. | |
| 5,842,002 A | 11/1998 | Schnurer et al. | |
| 5,978,917 A | 11/1999 | Chi | |
| 6,067,644 A * | 5/2000 | Levine | G06F 9/3824 712/227 |
| 6,088,803 A | 7/2000 | Tso et al. | |
| 6,094,677 A | 7/2000 | Capek et al. | |
| 6,269,330 B1 | 7/2001 | Cidon et al. | |
| 6,279,113 B1 | 8/2001 | Vaidya | |

(Continued)

FOREIGN PATENT DOCUMENTS

| | | | |
|---|---|---|---|
| GB | 2439806 | 1/2008 | |
| GB | 2490431 A * | 10/2012 | G06F 21/00 |

(Continued)

OTHER PUBLICATIONS

Hewlett-Packard, "QuickSpecs—HP Proliant DL360 Generation (G6)", Apr. 28, 2010, Hewlett-Packard, Version 29, pp. 4.*

(Continued)

*Primary Examiner* — Joseph P Hirl
*Assistant Examiner* — Stephen Gundry
(74) *Attorney, Agent, or Firm* — Rutan & Tucker, LLP

(57) ABSTRACT

According to one embodiment, a system comprises one or more counters; comparison logic; and one or more hardware processors communicatively coupled to the one or more counters and the comparison logic. The one or more hardware processors are configured to instantiate one or more virtual machines that are adapted to analyze received content, where the one or more virtual machines are configured to monitor a delay caused by one or more events conducted during processing of the content and identify the content as including malware if the delay exceed a first time period.

20 Claims, 7 Drawing Sheets

(56) References Cited

U.S. PATENT DOCUMENTS

| | | | |
|---|---|---|---|
| 6,298,445 B1 | 10/2001 | Shostack | |
| 6,357,008 B1* | 3/2002 | Nachenberg | 726/24 |
| 6,424,627 B1 | 7/2002 | Sorhaug et al. | |
| 6,484,315 B1 | 11/2002 | Ziese | |
| 6,487,666 B1 | 11/2002 | Shanklin et al. | |
| 6,493,756 B1 | 12/2002 | O'Brien et al. | |
| 6,550,012 B1 | 4/2003 | Villa et al. | |
| 6,775,657 B1 | 8/2004 | Baker | |
| 6,832,367 B1 | 12/2004 | Choi et al. | |
| 6,895,550 B2 | 5/2005 | Kanchirayappa et al. | |
| 6,898,632 B2 | 5/2005 | Gordy et al. | |
| 6,907,396 B1 | 6/2005 | Muttik et al. | |
| 6,981,279 B1 | 12/2005 | Arnold et al. | |
| 7,007,107 B1 | 2/2006 | Ivchenko et al. | |
| 7,028,179 B2 | 4/2006 | Anderson et al. | |
| 7,043,757 B2 | 5/2006 | Hoefelmeyer et al. | |
| 7,069,316 B1 | 6/2006 | Gryaznov | |
| 7,080,408 B1 | 7/2006 | Pak et al. | |
| 7,093,002 B2 | 8/2006 | Wolff et al. | |
| 7,093,239 B1* | 8/2006 | van der Made | 717/135 |
| 7,100,201 B2 | 8/2006 | Izatt | |
| 7,159,149 B2 | 1/2007 | Spiegel et al. | |
| 7,231,667 B2 | 6/2007 | Jordan | |
| 7,240,364 B1 | 7/2007 | Branscomb et al. | |
| 7,240,368 B1 | 7/2007 | Roesch et al. | |
| 7,287,278 B2 | 10/2007 | Liang | |
| 7,308,716 B2 | 12/2007 | Danford et al. | |
| 7,356,736 B2 | 4/2008 | Natvig | |
| 7,376,970 B2* | 5/2008 | Marinescu | G06F 21/566 726/22 |
| 7,386,888 B2 | 6/2008 | Liang et al. | |
| 7,392,542 B2 | 6/2008 | Bucher | |
| 7,418,729 B2 | 8/2008 | Szor | |
| 7,428,300 B1 | 9/2008 | Drew et al. | |
| 7,441,272 B2 | 10/2008 | Durham et al. | |
| 7,448,084 B1 | 11/2008 | Apap et al. | |
| 7,458,098 B2 | 11/2008 | Judge et al. | |
| 7,461,403 B1* | 12/2008 | Libenzi | H04L 63/145 709/224 |
| 7,464,404 B2 | 12/2008 | Carpenter et al. | |
| 7,464,407 B2 | 12/2008 | Nakae et al. | |
| 7,467,408 B1 | 12/2008 | O'Toole, Jr. | |
| 7,480,773 B1 | 1/2009 | Reed | |
| 7,487,543 B2 | 2/2009 | Arnold et al. | |
| 7,490,353 B2* | 2/2009 | Kohavi | G06F 21/51 713/189 |
| 7,496,960 B1 | 2/2009 | Chen et al. | |
| 7,496,961 B2 | 2/2009 | Zimmer et al. | |
| 7,519,990 B1 | 4/2009 | Xie | |
| 7,523,493 B2 | 4/2009 | Liang et al. | |
| 7,530,104 B1 | 5/2009 | Thrower et al. | |
| 7,530,106 B1* | 5/2009 | Zaitsev et al. | 726/24 |
| 7,540,025 B2 | 5/2009 | Tzadikario | |
| 7,555,777 B2* | 6/2009 | Swimmer et al. | 726/23 |
| 7,565,550 B2 | 7/2009 | Liang et al. | |
| 7,603,715 B2 | 10/2009 | Costa et al. | |
| 7,607,171 B1 | 10/2009 | Marsden et al. | |
| 7,639,714 B2 | 12/2009 | Stolfo et al. | |
| 7,644,441 B2 | 1/2010 | Schmid et al. | |
| 7,676,841 B2 | 3/2010 | Sobchuk et al. | |
| 7,698,548 B2 | 4/2010 | Shelest et al. | |
| 7,707,633 B2 | 4/2010 | Danford et al. | |
| 7,779,463 B2 | 8/2010 | Stolfo et al. | |
| 7,784,097 B1 | 8/2010 | Stolfo et al. | |
| 7,832,008 B1 | 11/2010 | Kraemer | |
| 7,849,506 B1 | 12/2010 | Dansey et al. | |
| 7,869,073 B2 | 1/2011 | Oshima | |
| 7,877,803 B2 | 1/2011 | Enstone et al. | |
| 7,904,959 B2 | 3/2011 | Sidiroglou et al. | |
| 7,908,660 B2 | 3/2011 | Bahl | |
| 7,930,738 B1 | 4/2011 | Petersen | |
| 7,937,761 B1 | 5/2011 | Bennett | |
| 7,996,556 B2 | 8/2011 | Raghavan et al. | |
| 7,996,836 B1 | 8/2011 | McCorkendale et al. | |
| 7,996,905 B2 | 8/2011 | Arnold et al. | |
| 8,006,305 B2 | 8/2011 | Aziz | |
| 8,010,667 B2 | 8/2011 | Zhang et al. | |
| 8,020,206 B2 | 9/2011 | Hubbard et al. | |
| 8,028,338 B1 | 9/2011 | Schneider et al. | |
| 8,045,094 B2 | 10/2011 | Teragawa | |
| 8,045,458 B2 | 10/2011 | Alperovitch et al. | |
| 8,069,484 B2 | 11/2011 | McMillan et al. | |
| 8,087,086 B1 | 12/2011 | Lai et al. | |
| 8,112,483 B1* | 2/2012 | Emigh et al. | 709/206 |
| 8,171,553 B2 | 5/2012 | Aziz et al. | |
| 8,201,246 B1 | 6/2012 | Wu et al. | |
| 8,204,984 B1 | 6/2012 | Aziz et al. | |
| 8,220,055 B1 | 7/2012 | Kennedy | |
| 8,225,288 B2 | 7/2012 | Miller et al. | |
| 8,225,373 B2 | 7/2012 | Kraemer | |
| 8,233,882 B2 | 7/2012 | Rogel | |
| 8,234,709 B2 | 7/2012 | Viljoen et al. | |
| 8,239,944 B1 | 8/2012 | Nachenberg et al. | |
| 8,286,251 B2 | 10/2012 | Eker et al. | |
| 8,291,499 B2 | 10/2012 | Aziz et al. | |
| 8,307,435 B1 | 11/2012 | Mann et al. | |
| 8,307,443 B2 | 11/2012 | Wang et al. | |
| 8,312,545 B2 | 11/2012 | Tuvell et al. | |
| 8,321,936 B1 | 11/2012 | Green et al. | |
| 8,321,941 B2 | 11/2012 | Tuvell et al. | |
| 8,365,286 B2 | 1/2013 | Poston | |
| 8,370,938 B1 | 2/2013 | Daswani et al. | |
| 8,370,939 B2 | 2/2013 | Zaitsev et al. | |
| 8,375,444 B2 | 2/2013 | Aziz et al. | |
| 8,381,299 B2 | 2/2013 | Stolfo et al. | |
| 8,402,529 B1 | 3/2013 | Green et al. | |
| 8,510,827 B1 | 8/2013 | Leake et al. | |
| 8,510,842 B2 | 8/2013 | Amit et al. | |
| 8,516,593 B2 | 8/2013 | Aziz | |
| 8,528,086 B1 | 9/2013 | Aziz | |
| 8,539,582 B1 | 9/2013 | Aziz et al. | |
| 8,549,638 B2 | 10/2013 | Aziz | |
| 8,561,177 B1 | 10/2013 | Aziz et al. | |
| 8,566,946 B1 | 10/2013 | Aziz et al. | |
| 8,584,094 B2 | 11/2013 | Dadhia et al. | |
| 8,584,234 B1 | 11/2013 | Sobel et al. | |
| 8,584,239 B2 | 11/2013 | Aziz et al. | |
| 8,595,834 B2 | 11/2013 | Xie et al. | |
| 8,627,476 B1 | 1/2014 | Satish et al. | |
| 8,635,696 B1 | 1/2014 | Aziz | |
| 8,689,333 B2 | 4/2014 | Aziz | |
| 8,713,681 B2 | 4/2014 | Silberman et al. | |
| 8,763,125 B1* | 6/2014 | Feng | G06F 21/56 713/175 |
| 8,776,229 B1 | 7/2014 | Aziz | |
| 8,793,787 B2 | 7/2014 | Ismael et al. | |
| 8,832,829 B2 | 9/2014 | Manni et al. | |
| 8,850,571 B2 | 9/2014 | Staniford et al. | |
| 8,881,282 B1 | 11/2014 | Aziz et al. | |
| 8,898,788 B1 | 11/2014 | Aziz et al. | |
| 8,935,779 B2 | 1/2015 | Manni et al. | |
| 8,984,638 B1 | 3/2015 | Aziz et al. | |
| 8,990,939 B2 | 3/2015 | Staniford et al. | |
| 8,990,944 B1 | 3/2015 | Singh et al. | |
| 8,997,219 B2 | 3/2015 | Staniford et al. | |
| 9,009,822 B1 | 4/2015 | Ismael et al. | |
| 9,009,823 B1 | 4/2015 | Ismael et al. | |
| 9,027,135 B1 | 5/2015 | Aziz | |
| 9,071,638 B1 | 6/2015 | Aziz et al. | |
| 9,104,867 B1 | 8/2015 | Thioux et al. | |
| 9,106,694 B2 | 8/2015 | Aziz et al. | |
| 9,118,715 B2 | 8/2015 | Staniford et al. | |
| 9,159,035 B1 | 10/2015 | Ismael et al. | |
| 9,171,160 B2 | 10/2015 | Vincent et al. | |
| 9,176,843 B1 | 11/2015 | Ismael et al. | |
| 9,189,627 B1 | 11/2015 | Islam | |
| 9,195,829 B1 | 11/2015 | Goradia et al. | |
| 9,223,972 B1 | 12/2015 | Vincent et al. | |
| 9,225,740 B1 | 12/2015 | Ismael et al. | |
| 9,241,010 B1 | 1/2016 | Bennett et al. | |
| 9,251,343 B1 | 2/2016 | Vincent et al. | |
| 9,262,635 B2 | 2/2016 | Paithane et al. | |
| 9,282,109 B1 | 3/2016 | Aziz et al. | |
| 9,292,686 B2 | 3/2016 | Ismael et al. | |

(56) References Cited

U.S. PATENT DOCUMENTS

| | | |
|---|---|---|
| 9,294,501 B2 | 3/2016 | Mesdaq et al. |
| 9,300,686 B2 | 3/2016 | Pidathala et al. |
| 9,306,960 B1 | 4/2016 | Aziz |
| 9,306,974 B1 | 4/2016 | Aziz et al. |
| 9,311,479 B1 | 4/2016 | Manni et al. |
| 9,355,247 B1 | 5/2016 | Thioux et al. |
| 9,356,944 B1 | 5/2016 | Aziz |
| 9,363,280 B1 | 6/2016 | Rivlin et al. |
| 9,367,681 B1 | 6/2016 | Ismael et al. |
| 9,398,028 B1 | 7/2016 | Karandikar et al. |
| 2001/0005889 A1 | 6/2001 | Albrecht |
| 2001/0047326 A1 | 11/2001 | Broadbent et al. |
| 2002/0018903 A1 | 2/2002 | Kokubo et al. |
| 2002/0038430 A1 | 3/2002 | Edwards et al. |
| 2002/0091819 A1 | 7/2002 | Melchione et al. |
| 2002/0144156 A1 | 10/2002 | Copeland, III |
| 2002/0162015 A1 | 10/2002 | Tang |
| 2002/0166063 A1 | 11/2002 | Lachman et al. |
| 2002/0184528 A1 | 12/2002 | Shevenell et al. |
| 2002/0188887 A1 | 12/2002 | Largman et al. |
| 2002/0194490 A1 | 12/2002 | Halperin et al. |
| 2003/0074578 A1 | 4/2003 | Ford et al. |
| 2003/0084318 A1 | 5/2003 | Schertz |
| 2003/0115483 A1 | 6/2003 | Liang |
| 2003/0188190 A1 | 10/2003 | Aaron et al. |
| 2003/0200460 A1 | 10/2003 | Morota et al. |
| 2003/0212902 A1 | 11/2003 | Van Der Made |
| 2003/0237000 A1 | 12/2003 | Denton et al. |
| 2004/0003323 A1 | 1/2004 | Bennett et al. |
| 2004/0015712 A1 | 1/2004 | Szor |
| 2004/0019832 A1 | 1/2004 | Arnold et al. |
| 2004/0047356 A1 | 3/2004 | Bauer |
| 2004/0083408 A1 | 4/2004 | Spiegel et al. |
| 2004/0093513 A1 | 5/2004 | Cantrell et al. |
| 2004/0111531 A1 | 6/2004 | Staniford et al. |
| 2004/0165588 A1 | 8/2004 | Pandya |
| 2004/0236963 A1 | 11/2004 | Danford et al. |
| 2004/0243349 A1 | 12/2004 | Greifeneder et al. |
| 2004/0249911 A1 | 12/2004 | Alkhatib et al. |
| 2004/0255161 A1 | 12/2004 | Cavanaugh |
| 2004/0268147 A1 | 12/2004 | Wiederin et al. |
| 2005/0021740 A1 | 1/2005 | Bar et al. |
| 2005/0033960 A1 | 2/2005 | Vialen et al. |
| 2005/0033989 A1 | 2/2005 | Poletto et al. |
| 2005/0050148 A1 | 3/2005 | Mohammadioun et al. |
| 2005/0086523 A1 | 4/2005 | Zimmer et al. |
| 2005/0091513 A1 | 4/2005 | Mitomo et al. |
| 2005/0091533 A1 | 4/2005 | Omote et al. |
| 2005/0114663 A1 | 5/2005 | Cornell et al. |
| 2005/0125195 A1 | 6/2005 | Brendel |
| 2005/0157662 A1 | 7/2005 | Bingham et al. |
| 2005/0183143 A1 | 8/2005 | Anderholm et al. |
| 2005/0201297 A1 | 9/2005 | Peikari |
| 2005/0210533 A1 | 9/2005 | Copeland et al. |
| 2005/0238005 A1 | 10/2005 | Chen et al. |
| 2005/0265331 A1 | 12/2005 | Stolfo |
| 2006/0010495 A1 | 1/2006 | Cohen et al. |
| 2006/0015715 A1 | 1/2006 | Anderson |
| 2006/0021054 A1 | 1/2006 | Costa et al. |
| 2006/0031476 A1 | 2/2006 | Mathes et al. |
| 2006/0047665 A1 | 3/2006 | Neil |
| 2006/0070130 A1 | 3/2006 | Costea et al. |
| 2006/0075496 A1 | 4/2006 | Carpenter et al. |
| 2006/0095968 A1 | 5/2006 | Portolani et al. |
| 2006/0101516 A1 | 5/2006 | Sudaharan et al. |
| 2006/0101517 A1 | 5/2006 | Banzhof et al. |
| 2006/0117385 A1 | 6/2006 | Mester et al. |
| 2006/0123477 A1 | 6/2006 | Raghavan et al. |
| 2006/0143709 A1 | 6/2006 | Brooks et al. |
| 2006/0150249 A1 | 7/2006 | Gassen et al. |
| 2006/0161983 A1 | 7/2006 | Cothrell et al. |
| 2006/0161987 A1 | 7/2006 | Levy-Yurista |
| 2006/0161989 A1 | 7/2006 | Reshef et al. |
| 2006/0164199 A1 | 7/2006 | Gilde et al. |
| 2006/0173992 A1 | 8/2006 | Weber et al. |
| 2006/0179147 A1 | 8/2006 | Tran et al. |
| 2006/0184632 A1 | 8/2006 | Marino et al. |
| 2006/0191010 A1 | 8/2006 | Benjamin |
| 2006/0221956 A1 | 10/2006 | Narayan et al. |
| 2006/0236393 A1 | 10/2006 | Kramer et al. |
| 2006/0242709 A1 | 10/2006 | Seinfeld et al. |
| 2006/0251104 A1 | 11/2006 | Koga |
| 2006/0288417 A1 | 12/2006 | Bookbinder et al. |
| 2007/0006288 A1 | 1/2007 | Mayfield et al. |
| 2007/0006313 A1 | 1/2007 | Porras et al. |
| 2007/0011174 A1 | 1/2007 | Takaragi et al. |
| 2007/0016951 A1 | 1/2007 | Piccard et al. |
| 2007/0033645 A1 | 2/2007 | Jones |
| 2007/0038943 A1 | 2/2007 | FitzGerald et al. |
| 2007/0064689 A1 | 3/2007 | Shin et al. |
| 2007/0094730 A1 | 4/2007 | Bhikkaji et al. |
| 2007/0143827 A1 | 6/2007 | Nicodemus et al. |
| 2007/0156895 A1 | 7/2007 | Vuong |
| 2007/0157180 A1 | 7/2007 | Tillmann et al. |
| 2007/0157306 A1 | 7/2007 | Elrod et al. |
| 2007/0171824 A1 | 7/2007 | Ruello et al. |
| 2007/0174915 A1* | 7/2007 | Gribble .................. G06F 21/53 726/24 |
| 2007/0192500 A1 | 8/2007 | Lum |
| 2007/0192858 A1 | 8/2007 | Lum |
| 2007/0198275 A1 | 8/2007 | Malden et al. |
| 2007/0240218 A1 | 10/2007 | Tuvell et al. |
| 2007/0240219 A1 | 10/2007 | Tuvell et al. |
| 2007/0240220 A1 | 10/2007 | Tuvell et al. |
| 2007/0240222 A1 | 10/2007 | Tuvell et al. |
| 2007/0250927 A1* | 10/2007 | Naik .................... G06F 21/566 726/22 |
| 2007/0250930 A1 | 10/2007 | Aziz et al. |
| 2007/0271446 A1 | 11/2007 | Nakamura |
| 2008/0005782 A1 | 1/2008 | Aziz |
| 2008/0016339 A1* | 1/2008 | Shukla .................. G06F 21/53 713/164 |
| 2008/0040710 A1 | 2/2008 | Chiriac |
| 2008/0072326 A1 | 3/2008 | Danford et al. |
| 2008/0077793 A1 | 3/2008 | Tan et al. |
| 2008/0080518 A1 | 4/2008 | Hoeflin et al. |
| 2008/0098476 A1 | 4/2008 | Syversen |
| 2008/0120722 A1 | 5/2008 | Sima et al. |
| 2008/0134178 A1 | 6/2008 | Fitzgerald et al. |
| 2008/0134334 A1 | 6/2008 | Kim et al. |
| 2008/0141376 A1 | 6/2008 | Clausen et al. |
| 2008/0181227 A1* | 7/2008 | Todd ............................ 370/392 |
| 2008/0184373 A1 | 7/2008 | Traut et al. |
| 2008/0189787 A1 | 8/2008 | Arnold et al. |
| 2008/0215742 A1 | 9/2008 | Goldszmidt et al. |
| 2008/0222729 A1 | 9/2008 | Chen et al. |
| 2008/0263665 A1 | 10/2008 | Ma et al. |
| 2008/0295172 A1 | 11/2008 | Bohacek |
| 2008/0301810 A1 | 12/2008 | Lehane et al. |
| 2008/0307524 A1 | 12/2008 | Singh et al. |
| 2008/0320594 A1 | 12/2008 | Jiang |
| 2009/0007100 A1 | 1/2009 | Field et al. |
| 2009/0013408 A1 | 1/2009 | Schipka |
| 2009/0031423 A1 | 1/2009 | Liu et al. |
| 2009/0036111 A1 | 2/2009 | Danford et al. |
| 2009/0044024 A1 | 2/2009 | Oberheide et al. |
| 2009/0044274 A1 | 2/2009 | Budko et al. |
| 2009/0083369 A1 | 3/2009 | Marmor |
| 2009/0083855 A1 | 3/2009 | Apap et al. |
| 2009/0089879 A1 | 4/2009 | Wang et al. |
| 2009/0094697 A1 | 4/2009 | Provos et al. |
| 2009/0125976 A1 | 5/2009 | Wassermann et al. |
| 2009/0126015 A1 | 5/2009 | Monastyrsky et al. |
| 2009/0126016 A1 | 5/2009 | Sobko et al. |
| 2009/0133125 A1 | 5/2009 | Choi et al. |
| 2009/0158430 A1 | 6/2009 | Borders |
| 2009/0187992 A1 | 7/2009 | Poston |
| 2009/0193293 A1 | 7/2009 | Stolfo et al. |
| 2009/0199296 A1 | 8/2009 | Xie et al. |
| 2009/0228233 A1 | 9/2009 | Anderson et al. |
| 2009/0241187 A1 | 9/2009 | Troyansky |
| 2009/0241190 A1 | 9/2009 | Todd et al. |
| 2009/0265692 A1 | 10/2009 | Godefroid et al. |
| 2009/0271867 A1 | 10/2009 | Zhang |

(56) References Cited

U.S. PATENT DOCUMENTS

| | | |
|---|---|---|
| 2009/0300761 A1 | 12/2009 | Park et al. |
| 2009/0320011 A1* | 12/2009 | Chow ................. G06F 11/3612 717/154 |
| 2009/0328185 A1 | 12/2009 | Berg et al. |
| 2009/0328221 A1 | 12/2009 | Blumfield et al. |
| 2010/0017546 A1 | 1/2010 | Poo et al. |
| 2010/0043073 A1 | 2/2010 | Kuwamura |
| 2010/0054278 A1 | 3/2010 | Stolfo et al. |
| 2010/0058474 A1 | 3/2010 | Hicks |
| 2010/0064044 A1 | 3/2010 | Nonoyama |
| 2010/0077481 A1 | 3/2010 | Polyakov et al. |
| 2010/0083376 A1 | 4/2010 | Pereira et al. |
| 2010/0115621 A1 | 5/2010 | Staniford et al. |
| 2010/0132038 A1 | 5/2010 | Zaitsev |
| 2010/0154056 A1 | 6/2010 | Smith et al. |
| 2010/0192223 A1 | 7/2010 | Ismael et al. |
| 2010/0251104 A1 | 9/2010 | Massand |
| 2010/0281102 A1 | 11/2010 | Chinta et al. |
| 2010/0281541 A1 | 11/2010 | Stolfo et al. |
| 2010/0281542 A1 | 11/2010 | Stolfo et al. |
| 2010/0287260 A1 | 11/2010 | Peterson et al. |
| 2011/0025504 A1 | 2/2011 | Lyon et al. |
| 2011/0041179 A1 | 2/2011 | Stahlberg |
| 2011/0047594 A1 | 2/2011 | Mahaffey et al. |
| 2011/0047620 A1 | 2/2011 | Mahaffey et al. |
| 2011/0078794 A1 | 3/2011 | Manni et al. |
| 2011/0093951 A1 | 4/2011 | Aziz |
| 2011/0099633 A1 | 4/2011 | Aziz |
| 2011/0113231 A1 | 5/2011 | Kaminsky |
| 2011/0145920 A1 | 6/2011 | Mahaffey et al. |
| 2011/0167494 A1 | 7/2011 | Bowen et al. |
| 2011/0225651 A1* | 9/2011 | Villasenor ............... G06F 21/85 726/22 |
| 2011/0247072 A1* | 10/2011 | Staniford ............ H04L 63/1416 726/24 |
| 2011/0265182 A1 | 10/2011 | Peinado et al. |
| 2011/0307954 A1 | 12/2011 | Melnik et al. |
| 2011/0307955 A1 | 12/2011 | Kaplan et al. |
| 2011/0307956 A1 | 12/2011 | Yermakov et al. |
| 2011/0314546 A1 | 12/2011 | Aziz et al. |
| 2012/0079596 A1 | 3/2012 | Thomas et al. |
| 2012/0084859 A1 | 4/2012 | Radinsky et al. |
| 2012/0117652 A1 | 5/2012 | Manni et al. |
| 2012/0174186 A1 | 7/2012 | Aziz et al. |
| 2012/0174218 A1 | 7/2012 | McCoy et al. |
| 2012/0198279 A1 | 8/2012 | Schroeder |
| 2012/0210423 A1 | 8/2012 | Friedrichs et al. |
| 2012/0222121 A1 | 8/2012 | Staniford et al. |
| 2012/0255012 A1* | 10/2012 | Sallam .................. G06F 21/52 726/24 |
| 2012/0265976 A1* | 10/2012 | Spiers et al. .................. 713/2 |
| 2012/0278886 A1 | 11/2012 | Luna |
| 2012/0291131 A1* | 11/2012 | Turkulainen et al. .......... 726/24 |
| 2012/0297489 A1 | 11/2012 | Dequevy |
| 2012/0304244 A1* | 11/2012 | Xie .......................... G06F 21/00 726/1 |
| 2012/0330801 A1 | 12/2012 | McDougal et al. |
| 2012/0331553 A1* | 12/2012 | Aziz ..................... G06F 21/554 726/23 |
| 2013/0036472 A1 | 2/2013 | Aziz |
| 2013/0047257 A1 | 2/2013 | Aziz |
| 2013/0067577 A1* | 3/2013 | Turbin .................. G06F 21/562 726/24 |
| 2013/0086684 A1* | 4/2013 | Mohler .................. G06F 21/53 726/24 |
| 2013/0097699 A1* | 4/2013 | Balupari ............... G06F 21/552 726/22 |
| 2013/0097706 A1* | 4/2013 | Titonis .................... G06F 21/56 726/24 |
| 2013/0117741 A1* | 5/2013 | Prabhakaran et al. ............. 718/1 |
| 2013/0139265 A1* | 5/2013 | Romanenko ............ G06F 21/56 726/24 |
| 2013/0145463 A1* | 6/2013 | Ghosh ...................... G06F 21/56 726/22 |
| 2013/0160130 A1 | 6/2013 | Mendelev et al. |
| 2013/0160131 A1 | 6/2013 | Madou et al. |
| 2013/0227691 A1 | 8/2013 | Aziz et al. |
| 2013/0246370 A1 | 9/2013 | Bartram et al. |
| 2013/0263260 A1 | 10/2013 | Mahaffey et al. |
| 2013/0291051 A1* | 10/2013 | Balinsky ................. G06F 21/00 726/1 |
| 2013/0291109 A1 | 10/2013 | Staniford et al. |
| 2013/0298243 A1* | 11/2013 | Kumar ................... G06F 21/52 726/25 |
| 2013/0312098 A1* | 11/2013 | Kapoor ................. G06F 21/554 726/24 |
| 2013/0312099 A1* | 11/2013 | Edwards ............... G06F 21/554 726/24 |
| 2014/0007228 A1* | 1/2014 | Ngair ..................... G06F 21/56 726/22 |
| 2014/0053260 A1 | 2/2014 | Gupta et al. |
| 2014/0053261 A1 | 2/2014 | Gupta et al. |

FOREIGN PATENT DOCUMENTS

| | | |
|---|---|---|
| WO | WO-02/06928 | 1/2002 |
| WO | WO-02/23805 | 3/2002 |
| WO | WO-2007-117636 | 10/2007 |
| WO | WO-2008/041950 | 4/2008 |
| WO | WO-2011/084431 | 7/2011 |
| WO | WO-2012145066 | 10/2012 |

OTHER PUBLICATIONS

D. Levinthal, "Performance Analysis Guide for Intel Core i7 Processor and Intel Xeon 5500 processors", 2009, Intel Corp, Version 1.0, pp. 12.*

C. Kolbitsch et al., "The Power of Procrastination: Detection and Mitigation of Execution-Stalling Malicious Code" in Proceedings of the 18th ACM Conference on Computer and Communications Security, 2011, ACM, pp. 1-12.*

J. Crandall et al., "Temperal Search: Detecting Hidden Timebombs with Virtual Machines" in Proceedings of 9th International Conference on Architectural Support for Programming Languages and Operating Systems, 2006, ACM, pp. 25-36.*

Lastline Labs, The Threat of Evasive Malware, Feb. 25, 2013, Lastline Labs, pp. 1-8.*

Hiroshi Shinotsuka, Malware Authors Using New Techniques to Evade Automated Threat Analysis Systems, Oct. 26, 2012, http://www.symantec.com/connect/blogs/, pp. 1-4.*

Lindorfer et al., Detecting environment-sensitive malware, 2011, Springer-Verlag Berlin, RAID'11 Proceedings of the 14th international conference on Recent Advances in Intrusion Detection, pp. 1-20.*

IEEE Xplore Digital Library Sear Results for "detection of unknown computer worms". Http://ieeexplore.ieee.org/searchresult.jsp?SortField=Score&SortOrder=desc&ResultC . . . , (Accessed on Aug. 28, 2009).

AltaVista Advanced Search Results. "Event Orchestrator". Http://www.altavista.com/web/results?Itag=ody&pg=aq &aqmode=aqa=Event+Orchesrator . . . , (Accessed on Sep. 3, 2009).

AltaVista Advanced Search Results. "attack vector identifier". Http://www.altavista.com/web/results?Itag=ody&pg=aq &aqmode=aqa=Event+Orchestrator . . . , (Accessed on Sep. 15, 2009).

Cisco, Configuring the Catalyst Switched Port Analyzer (SPAN) ("Cisco"),(1992-2003).

Reiner Sailer, Enriquillo Valdez, Trent Jaeger, Roonald Perez, Leendert van Doorn, John Linwood Griffin, Stefan Berger., sHype: Secure Hypervisor Approach to Trusted Virtualized Systems (Feb. 2, 2005) ("Sailer").

Excerpt regarding First Printing Date for Merike Kaeo, Designing Network Security ("Kaeo"), (2005).

The Sniffers's Guide to Raw Traffic available at: yuba.stanford.edu/~casado/pcap/section1.html, (Jan. 6, 2014).

(56) References Cited

OTHER PUBLICATIONS

"Network Security: NetDetector—Network Intrusion Forensic System (NIFS) Whitepaper", ("*NetDetector Whitepaper*"), (2003).
"Packet", *Microsoft Computer Dictionary*, Microsoft Press, (Mar. 2002), 1 page.
"When Virtual is Better Than Real", *IEEEXplore Digital Library*, available at, http://ieeexplore.ieee.org/xpl/articleDetails.jsp?reload=true&arnumber=990073, (Dec. 7, 2013).
Abdullah, et al., *Visualizing Network Data for Intrusion Detection*, 2005 IEEE Workshop on Information Assurance and Security, pp. 100-108.
Adetoye, Adedayo, et al., "Network Intrusion Detection & Response System", ("Adetoye"), (Sep. 2003).
Aura, Tuomas, "Scanning electronic documents for personally identifiable information", Proceedings of the 5th ACM workshop on Privacy in electronic society. ACM, 2006.
Baecher, "The Nepenthes Platform: An Efficient Approach to collect Malware", Springer-verlag Berlin Heidelberg, (2006), pp. 165-184.
Bayer, et al., "Dynamic Analysis of Malicious Code", *J Comput Virol*, Springer-Verlag, France., (2006), pp. 67-77.
Boubalos, Chris, "Extracting syslog data out of raw pcap dumps, seclists.org, Honeypots mailing list archives", available at http://seclists.org/honeypots/2003/q2/319 ("Boubalos"), (Jun. 5, 2003).
Chaudet, C., et al., "Optimal Positioning of Active and Passive Monitoring Devices", *International Conference on Emerging Networking Experiments and Technologies, Proceedings of the 2005 ACM Conference on Emerging Network Experiment and Technology*, CoNEXT '05, Toulousse, France, (Oct. 2005), pp. 71-82.
Cohen, M.I., "PyFlag—An advanced network forensic framework", *Digital investigation 5*, Elsevier, (2008), pp. S112-S120.
Costa, M., et al., "Vigilante: End-to-End Containment of Internet Worms", *SOSP '05, Association for Computing Machinery, Inc.*, Brighton (Oct. 23-26, 2005).
Crandall, J.R., et al., "Minos:Control Data Attack Prevention Orthogonal to Memory Model", *37th International Symposium on Microarchitecture*, Portland, Oregon, (Dec. 2004).
Deutsch, P., ""Zlib compressed data format specification version 3.3" RFC 1950, (1996)".
Distler, "Malware Analysis:An Introduction", *SANS Institute InfoSec Reading Room*, SANS Institute, (2007).
Dunlap, George W., et al., "ReVirt: Enabling Intrusion Analysis through Virtual-Machine Logging and Replay", *Proceeding of the 5th Symposium on Operating Systems Design and Implementation, USENIX Association*, ("Dunlap"), (Dec. 9, 2002).
Filiol, Eric, et al., "Combinatorial Optimisation of Worm Propagation on an Unknown Network", International Journal of Computer Science 2.2 (2007).
Goel, et al., Reconstructing System State for Intrusion Analysis, Apr. 2008 *SIGOPS Operating Systems Review*, vol. 42 Issue 3, pp. 21-28.
Hjelmvik, Erik, "Passive Network Security Analysis with NetworkMiner", (*IN*)*SECURE*, Issue 18, (Oct. 2008), pp. 1-100.
Kaeo, Merike, "Designing Network Security", ("Kaeo"), (Nov. 2003).
Kim, H., et al., "Autograph: Toward Automated, Distributed Worm Signature Detection", *Proceedings of the 13th Usenix Security Symposium (Security 2004)*, San Diego, (Aug. 2004), pp. 271-286.

Krasnyansky, Max, et al., *Universal TUN/TAP driver*, available at https://www.kernel.org/doc/Documentation/networking/tuntap.txt (2002) ("Krasnyansky").
Kreibich, C., et al., "Honeycomb-Creating Intrusion Detection Signatures Using Honeypots", *2nd Workshop on Hot Topics in Networks (HotNets-11)*, Boston, USA, (2003).
Kristoff, J., "Botnets, Detection and Mitigation: DNS-Based Techniques", *NU Security Day*, (2005), 23 pages.
Liljenstam, Michael, et al., "Simulating Realistic Network Traffic for Worm Warning System Design and Testing", *Institute for Security Technology studies*, Dartmouth College, ("Liljenstam"), (Oct. 27, 2003).
Marchette, David J., "Computer Intrusion Detection and Network Monitoring: A Statistical Viewpoint", ("Marchette"), (2001).
Margolis, P.E., "Random House Webster's 'Computer & Internet Dictionary 3rd Edition'", ISBN 0375703519, (Dec. 1998).
Moore, D., et al., "Internet Quarantine: Requirements for Containing Self-Propagating Code", *INFOCOM*, vol. 3, (Mar. 30-Apr. 3, 2003), pp. 1901-1910.
Morales, Jose A., et al., "Analyzing and exploiting network behaviors of malware.", *Security and Privacy in Communication Networks*. Springer Berlin Heidelberg, 2010. 20-34.
Natvig, Kurt, "SandboxII: Internet", *Virus Bulletin Conference*, ("Natvig") (Sep. 2002).
NetBIOS Working Group. Protocol Standard for a NetBIOS Service on a TCP/UDP transport: Concepts and Methods. STD 19, RFC 1001, Mar. 1987.
Newsome, J., et al., "Dynamic Taint Analysis for Automatic Detection, Analysis, and Signature Generation of Exploits on Commodity Software", In *Proceedings of the 12th Annual Network and Distributed System Security, Symposium (NDSS '05)*, (Feb. 2005).
Newsome, J., et al., "Polygraph: Automatically Generating Signatures for Polymorphic Worms", In *Proceedings of the IEEE Symposium on Security and Privacy*, (May 2005).
Nojiri, D., et al., "Cooperation Response Strategies for Large Scale Attack Mitigation", *DARPA Information Survivability Conference and Exposition*, vol. 1, (Apr. 22-24, 2003), pp. 293-302.
Silicon Defense, "Worm Containment in the Internal Network", (Mar. 2003), pp. 1-25.
Singh, S., et al., "Automated Worm Fingerprinting", *Proceedings of the ACM/USENIX Symposium on Operating System Design and Implementation*, San Francisco, California, (Dec. 2004).
Spitzner, Lance, "Honeypots: Tracking Hackers", ("Spizner"), (Sep. 17, 2002).
Thomas H. Ptacek, and Timothy N. Newsham, "Insertion, Evasion, and Denial of Service: Eluding Network Intrusion Detection", *Secure Networks*, ("Ptacek"), (Jan. 1998).
Venezia, Paul, "NetDetector Captures Intrusions", *InfoWorld Issue 27*, ("Venezia"), (Jul. 14, 2003).
Whyte, et al., "DNS-Based Detection of Scanning Works in an Enterprise Network", *Proceedings of the 12th Annual Network and Distributed System Security Symposium*, (Feb. 2005), 15 pages.
Williamson, Matthew M., "Throttling Viruses: Restricting Propagation to Defeat Malicious Mobile Code", *ACSAC Conference*, Las Vegas, NV, USA, (Dec. 2002), pp. 1-9.
International Search Report from corresponding PCT/US2014/043727 application dated Sep. 25, 2014, from European Patent Office Officer Marc Meis.

* cited by examiner

SYSTEM AND METHOD FOR DETECTING TIME-BOMB MALWARE

FIELD

Embodiments of the disclosure relate to the field of data security. More specifically, one embodiment of the disclosure relates to a system, apparatus and method that enhances detection of time-bomb malware, namely malware with delayed activation.

GENERAL BACKGROUND

Over the last decade, malicious software (malware) attacks have become a pervasive problem for Internet users and enterprise network administrators. In most situations, malware is a program or file that is embedded within downloadable content and designed to adversely influence or attack normal operations of an electronic device (e.g. computer, tablet, smartphone, server, router, wearable technology, or other types of products with data processing capability). Examples of different types of malware may include bots, computer viruses, worms, Trojan horses, spyware, adware, or any other programming that operates within an electronic device without permission by the user or a system administrator.

Over the past few years, various types of security appliances have been deployed within an enterprise network in order to detect behaviors that signal the presence of malware. Some of these security appliances conduct dynamic analysis on suspicious content within a sandbox environment in order to determine if malware is present. As a result, some malware is now being coded to evade analysis within a sandbox environment.

Currently, there are various techniques that malware is using to evade sandboxed malware analysis. They can be broadly categorized as:

[1] Environment checking: Malware checks for several environmental facts to identify whether it is being run in a sandbox. In response, the malware may halt its execution to avoid detection upon sandbox detection. This may be accomplished by the malware querying for a CPUID string;

[2] User Interaction: Malware will not perform any malicious activity until some user interaction is provided, contrary to capabilities of most sandbox environments.

[3] Presence of AV/Detection tool: Malware checks for specific artifacts that indicate an anti-virus or sandboxed detection is in effect (e.g. if certain system APIs are hooked); and

[4] Stalling: Malware delays execution for substantial time such that the malicious activity is not performed within run-time of sandbox.

As a result, mechanisms are necessary to detect all types of malware, even malware that is specifically configured to evade detection within a sandbox environment such as a virtual machine (VM) based environment.

BRIEF DESCRIPTION OF THE DRAWINGS

Embodiments of the invention are illustrated by way of example and not by way of limitation in the figures of the accompanying drawings, in which like references indicate similar elements and in which.

DETAILED DESCRIPTION

Figure 1:
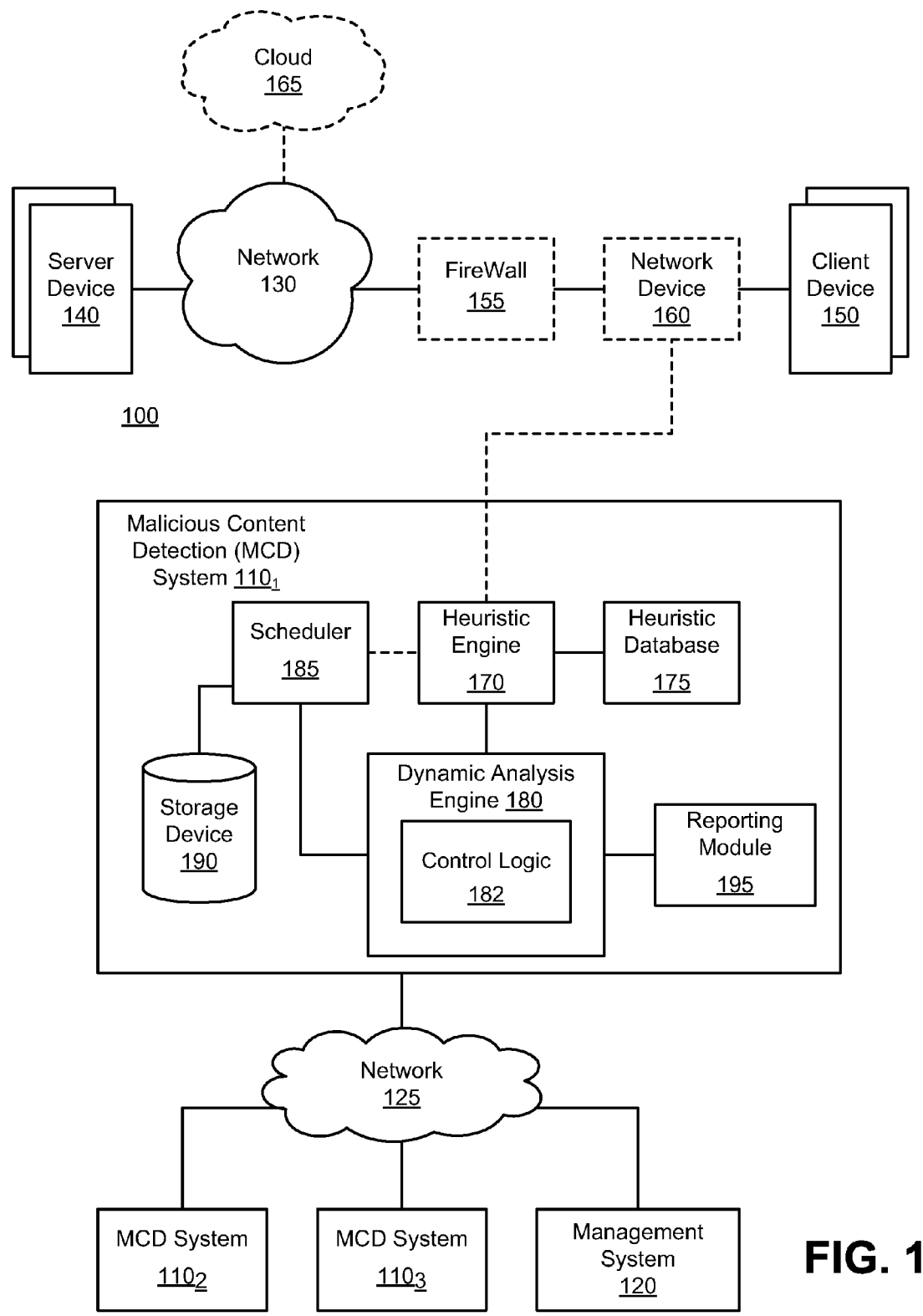
FIG. 1 is a first exemplary block diagram of a malware content detection (MCD) system with for multiple VMs deployed within a communication network.

Various embodiments of the disclosure relate to a system, apparatus and method for enhancing detection of malware that is configured to avoid detection within a sandbox environment, such as a virtual machine based (VM-based) analysis environment for example, through delayed activation. Such malware is commonly referred to as a "time-bomb malware". This enhanced detection may be conducted by tracking call site time delays and access frequency, which may be captured inside a VM in user-mode or kernel mode, inside of the virtual (execution) environment, or even external to the VM environment (e.g., frequency based threshold detection logic) and utilized to evade automated analysis environments.

One embodiment of the disclosure is directed to logic that is configured to monitor one or more operations within a VM-based analysis environment and, where applicable, adjusts one or more parameters associated with such operations. These operating parameters may involve requests and/or calls that delay further processing of content loaded into the VM-based analysis environment. For example, the operating parameter may include, but are not limited or restricted to (i) the number of Sleep request messages; (ii) an amount of time requested for a particular Sleep request message; (iii) the cumulative amount of Sleep time requested over a predetermined run time; (iv) the number of function calls from a particular call site to an API (e.g., addressed function such as a specific Application Programming Interface "API"); (v) the total frequency of the instruction pointer remaining within a particular address range; (vi) processor utilization level; or the like.

Hence, according to one embodiment of the disclosure, one or more counters may be deployed for monitoring the number of Sleep request messages initiated by the content under analysis. The content is determined to be associated with time-bomb malware if the number of Sleep request messages initiated by content under analysis exceeds a first threshold value (e.g. predetermined time value). Similarly, one or more counters may be deployed for monitoring whether the cumulative Sleep time for multiple Sleep request messages initiated by the content under analysis exceeds a second threshold value. If so, the content is determined to be associated with time-bomb malware.

Also, in the alternative or in combination with the sleep counter(s), one or more counters may be deployed for monitoring the total number of function calls initiated by the content under analysis. The content is determined to be associated with time-bomb malware if the total number of function calls exceeds a third threshold value. Similarly, one or more counters may be deployed for monitoring the number of function calls directed from a particular call site to an API by the content under analysis, where the content is determined to be associated with time-bomb malware if the number of function calls to the particular API exceed a fourth threshold.

According to a further embodiment of the disclosure, logic may be deployed to work in concert with each VM to monitor whether the content under analysis is repeatedly executing instructions located at a specific address or address range, which denotes a programming "loop" operation. If so, the content is determined to be associated with time-bomb malware.

In summary, multiple APIs and certain assembly instructions may be utilized by time-bomb malware to get OS time information. Also, the API access patterns for time delay purposes may vary from one malicious sample to another. For instance, the time-bomb malware may be a tightly loop execution, repeatedly performing GetLocalTime, Compare and/or Sleep calls, where detonation of the time-bomb malware occurs upon reaching a desired date. Other time-bomb malware may be a mixture of Sleep calls, Floating-Point Math calls, and/or subroutines that also stall and sleep. Yet another time-bomb malware may involve a tight execution loop of GetLocalTime, Compare, Sleep, and/or Cut-and-Paste operations, which identifies the importance of identifying the accessed call-site of the delay-execution code, so that proper threshold based statistics logic may be applied to multiple variants.

Herein, the disclosure describes different embodiments for addressing certain types of stall technique such as Sleep calls or the like. It is contemplated that the scope of the invention is directed to a mechanism that detects time-bomb malware associated with not only repeated Sleep calls but with any event or call variant adapted to stall malware execution to evade a sandbox environment.

I. Terminology

In the following description, certain terminology is used to describe features of the invention. For example, in certain situations, both terms "logic" and "engine" are representative of hardware, firmware and/or software that is configured to perform one or more functions. As hardware, logic (or engine) may include circuitry having data processing or storage functionality. Examples of such circuitry may include, but are not limited or restricted to a microprocessor; one or more processor cores; a programmable gate array; a microcontroller; an application specific integrated circuit; receiver, transmitter and/or transceiver circuitry; semiconductor memory; combinatorial circuitry; or the like.

Logic (or engine) also may be in the form of one or more software modules, such as executable code in the form of an executable application, an application programming interface (API), a subroutine, a function, a procedure, an applet, a servlet, a routine, source code, object code, a shared library/dynamic load library, or one or more instructions. These software modules may be stored in any type of a suitable non-transitory storage medium, or transitory storage medium (e.g., electrical, optical, acoustical or other form of propagated signals such as carrier waves, infrared signals, or digital signals). Examples of non-transitory storage medium may include, but are not limited or restricted to a programmable circuit; a semiconductor memory; non-persistent storage such as volatile memory (e.g., any type of random access memory "RAM"); persistent storage such as non-volatile memory (e.g., read-only memory "ROM", power-backed RAM, flash memory, phase-change memory, etc.), a solid-state drive, hard disk drive, an optical disc drive, or a portable memory device. As firmware, the executable code is stored in persistent storage.

The term "content" generally refers to information, such as text, software, images, audio, metadata and/or other digital data for example, that is transmitted as one or more messages. Each message(s) may be in the form of a packet, a frame, an Asynchronous Transfer Mode "ATM" cell, or any other series of bits having a prescribed format. The content may be received as a data flow, namely a group of related messages, being part of ingress data traffic.

One illustrative example of content includes web content, namely data traffic that may be transmitted using a Hypertext Transfer Protocol (HTTP), Hypertext Markup Language (HTML) protocol, or any other manner suitable for display on a Web browser software application. Another example of content includes one or more electronic mail (email) messages, which may be transmitted using an email protocol such as Simple Mail Transfer Protocol (SMTP), Post Office Protocol version 3 (POP3), or Internet Message Access Protocol (IMAP4). Yet another example of content includes an Instant Message, which may be transmitted using Session Initiation Protocol (SIP) or Extensible Messaging and Presence Protocol (XMPP) for example. A final example of content includes one or more files that are transferred using a data transfer protocol such as File Transfer Protocol (FTP) for subsequent storage on a file share.

The term "time-bomb malware" is software that includes at least one exploit, namely a particular portion of software that, after intentional delayed execution, takes advantage of one or more vulnerabilities within system software and produces an undesired behavior. The behavior is deemed to be "undesired" based on customer-specific rules, manufacturer-based rules, or any other type of rules formulated by public opinion or a particular governmental or commercial entity. Examples of an undesired behavior may include a communication-based anomaly or an execution-based anomaly that (i) alters the functionality of an electronic device and/or (ii) provides an unwanted functionality which may be generally acceptable in other context.

The term "transmission medium" is a communication path between two or more systems (e.g. any electronic devices with data processing functionality such as, for example, a security appliance, server, mainframe, computer, netbook, tablet, smart phone, router, switch, bridge or brouter). The communication path may include wired and/or wireless segments. Examples of wired and/or wireless segments include electrical wiring, optical fiber, cable, bus trace, or a wireless channel using infrared, radio frequency (RF), or any other wired/wireless signaling mechanism.

In general, a "virtual machine" (VM) is a simulation of an electronic device (abstract or real) that is usually different from the electronic device conducting the simulation. VMs may be based on specifications of a hypothetical electronic device or emulate the architecture and functions of a real world computer. A VM can be one of many different types such as, for example, hardware emulation, full virtualization, para-virtualization, and/or operating system-level virtualization virtual machines.

A "software profile" is information that is used for virtualization of an operating environment (e.g. instantiation of a VM) that is adapted to receive content for malware analysis. The software profile may identify a guest operating system "OS" type; a particular version of the guest OS; one or more different application types; particular version(s) of the application type(s); virtual device(s); or the like.

Lastly, the terms "or" and "and/or" as used herein are to be interpreted as inclusive or meaning any one or any combination. Therefore, "A, B or C" or "A, B and/or C" mean "any of the following: A; B; C; A and B; A and C; B and C; A, B and C." An exception to this definition will occur only when a combination of elements, functions, steps or acts are in some way inherently mutually exclusive.

As this invention is susceptible to embodiments of many different forms, it is intended that the present disclosure is to be considered as an example of the principles of the invention and not intended to limit the invention to the specific embodiments shown and described.

II. Time-Bomb Malware Detection Architecture

Referring to FIG. 1, an exemplary block diagram of a communication system 100 deploying a plurality of malware content detection (MCD) systems $110_1$-$110_N$ (N>1, e.g. N=3) communicatively coupled to a management system 120 via a network 125 is shown. In general, management system 120 is adapted to manage MCD systems $110_1$-$110_N$. For instance, management system 120 may be adapted to cause malware signatures generated as a result of time-bomb malware detection by any of MCD systems $110_1$-$110_N$ (e.g. MCD system $110_2$) to be shared with one or more of the other MCD systems $110_1$-$110_N$ (e.g. MCD system $110_1$) including where such sharing is conducted on a subscription basis.

Herein, according to this embodiment of the disclosure, first MCD system $110_1$ is an electronic device that is adapted to (i) intercept data traffic routed over a communication network 130 between at least one server device 140 and at least one client device 150 and (ii) monitor, in real-time, content within the data traffic. More specifically, first MCD system $110_1$ may be configured to inspect content received via communication network 130 and identify "suspicious" content. The incoming content is identified as "suspicious" when it is assessed, with a certain level of likelihood, that at least one characteristic identified during inspection of the content indicates the presence of an exploit.

Herein, according to one embodiment of the disclosure, the first MCD system $110_1$ is a web-based security appliance configured to inspect ingress data traffic and identify whether content associated with the data traffic includes time-bomb malware. The communication network 130 may include a public computer network such as the Internet, in which case an optional firewall 155 (represented by dashed lines) may be interposed between communication network 130 and client device(s) 150. Alternatively, the communication network 130 may be a private computer network such as a wireless telecommunication network, wide area network, or local area network, or a combination of networks.

The first MCD system $110_1$ is shown as being coupled with the communication network 130 (behind the firewall 155) via a network interface 160. The network interface 160 operates as a data capturing device (referred to as a "network tap") that is configured to receive data traffic propagating to/from the client device(s) 150 and provide some or all of the content associated with the data traffic (e.g. objects) to the first MCD system $110_1$.

In general, the network interface 160 receives and copies the content that is received from and provided to client device 150. Alternatively, the network interface 160 may copy only a portion of the content, for example, a particular number of objects associated with the content. For instance, in some embodiments, the network interface 160 may capture metadata from data traffic intended for client device 150, where the metadata is used to determine (i) whether content within the data traffic includes any exploits and/or (ii) the software profile used instantiating the VM(s) for exploit detection on the content.

It is contemplated that, for any embodiments where the first MCD system $110_1$ is implemented as an dedicated appliance or a dedicated computer system, the network interface 160 may include an assembly integrated into the appliance or computer system that includes network ports, network interface card and related logic (not shown) for connecting to the communication network 130 to non-disruptively "tap" data traffic propagating therethrough and provide a copy of the data traffic to the heuristic engine 170 of MCD system $110_1$. In other embodiments, the network interface 160 can be integrated into an intermediary device in the communication path (e.g. firewall 155, router, switch or other network device) or can be a standalone component, such as an appropriate commercially available network tap. In virtual environments, a virtual tap (vTAP) can be used to copy traffic from virtual networks.

Figure 2:
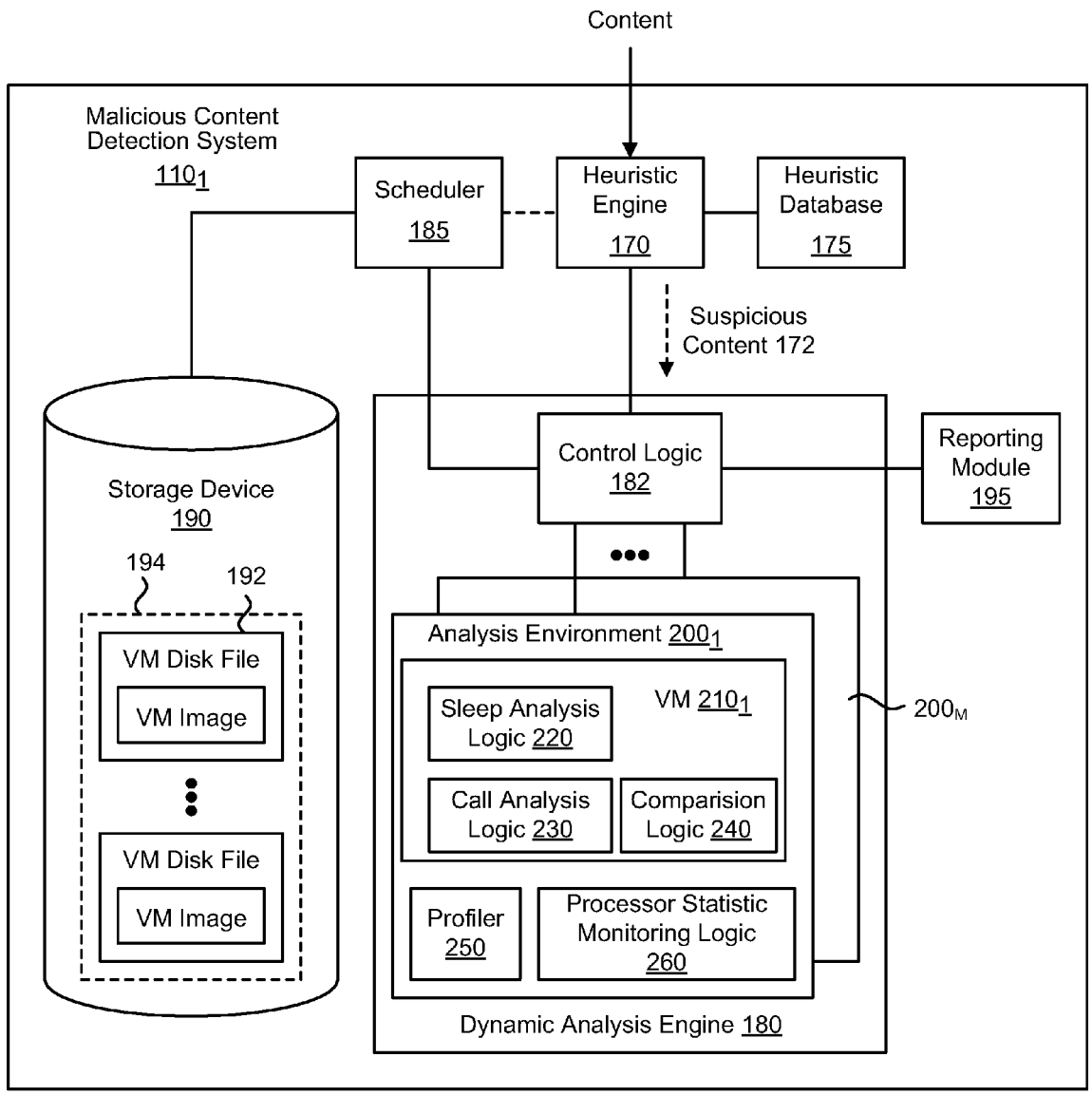
FIG. 2 is a detailed exemplary embodiment of the MCD system of FIG. 1.

Referring to both FIGS. 1 and 2, first MCD system $110_1$ comprises a heuristic engine 170, a heuristics database 175, an analysis engine 180, a scheduler 185, a storage device 190, and a reporting module 195. In some embodiments, the network interface 160 may be contained within the first MCD system $110_1$. Also, heuristic engine 170, analysis engine 180 and/or scheduler 185 may be hardware logic implemented with a processor or other types of circuitry. Alternatively, this logic may be configured as software modules executed by the same or different processors. As an example, the heuristic engine 170 may be one or more software modules executed by a first hardware processor implemented within the first MCD system $110_1$, while the analysis engine 180 and/or scheduler 185 may be executed by a second hardware processor. These processors may be located at geographically remote locations and communicatively coupled via a network.

In general, the heuristic engine 170 serves as a filter to permit subsequent malware analysis on portion(s) of incoming content that may have time-bomb malware. As an ancillary benefit, by analyzing only the portion of the incoming content that may have such malware, various system resources may be conserved and a faster response time may be provided in determining the presence of malware within analyzed content.

As still shown in FIG. 1, the heuristic engine 170 receives the incoming content from the network interface 160 and applies heuristics to determine if any of the content is "suspicious". The heuristics applied by the heuristic engine 170 may be based on data and/or rules stored in the heuristics database 175. Also, the heuristic engine 170 may examine the image of the captured content without executing or opening the captured content.

For example, the heuristic engine 170 may examine the metadata or attributes of the captured content and/or the code image (e.g., a binary image of an executable) to determine whether the captured content matches or has a high correlation with a predetermined pattern of attributes that is associated with a malicious attack, especially time-bomb malware attacks. According to one embodiment of the disclosure, the heuristic engine 170 flags content from one or more data flows as suspicious after applying this heuristic analysis.

It is contemplated that the heuristic engine 170 may comprise a static analysis tool 175 that is configured to parse malware binaries and specifically identify delay hotspots. A "delay hotspot" could be an API call or Sleep request with large timeout values or it could be a loop with high repeat counter. Such analysis can complement dynamic analysis technique and lead to more definitive detection of time-bomb malwares.

Thereafter, according to one embodiment of the disclosure, the heuristic engine 170 may be adapted to transmit at least a portion of the metadata or attributes of the suspicious content 172, which may identify attributes of the client device 150, to a control logic 182 implemented within analysis engine 180. Such metadata or attributes are used to identify software profile information used to instantiate at least one VM for subsequent malware analysis. In another embodiment of the disclosure, the control logic 182 may be adapted to receive one or more messages (e.g. data packets) from the heuristic engine 170 and analyze the message(s) to identify the software profile information for instantiating the VM(s) subsequently used for malware analysis.

Control logic 182 is adapted to control formation of one or more VM-based analysis environments $200_1$-$200_M$ as shown in FIG. 2. As shown herein, at least one analysis environment $200_1$ comprises a VM $210_1$ with corresponding sleep analysis logic 220 (e.g., one or more sleep counters, etc.) and call analysis logic 230 (e.g., one or more call counters, etc.), comparison logic 240 (e.g. one or more comparators, etc.) along with instruction pointer analysis logic (profiler) 250 and processor (CPU) statistic monitoring logic 260.

For instance, as an illustrative example, the suspicious content under analysis may include an email message that was generated, under control of Windows® 7 Operating System, using a Windows® Outlook 2007, version 12. The email message further includes a Portable Document Format (PDF) attachment in accordance with Adobe® Acrobat®, version 9.0. Upon determining that the email message includes suspicious content, heuristic engine 170 and/or control logic 182 may be adapted to provide software profile information to scheduler 185 in order to identify a particular type of VM needed to conduct dynamic analysis of the suspicious content. According to this illustrative example, the software profile information would identify the VM software as (1) Windows® 7 Operating System (OS); (2) Windows® Outlook 2007, version 12; and (3) Adobe® Acrobat® PDF reader that allows viewing of the above-identified PDF document.

The control logic 182 supplies the software profile information to the scheduler 185, which conducts a search of information within storage device 190 to determine if a VM image 192 identified by the software profile information resides within storage device 190. The VM image 192 supports the appropriate OS (e.g. Windows® 7 OS) and one or more applications (e.g., Windows® Outlook 2007, version 12; and Adobe® Acrobat® PDF reader). If so, the scheduler 185 uses that the VM image 192 to instantiate a VM within analysis environment $200_1$ in order to analyze the suspicious content and determine if such content is associated with time-bomb malware.

Of course, it is contemplated that if the storage device 190 does not feature a software profile supporting the above-identified OS/application(s), the scheduler 185 may simply ignore the VM request from control logic 182 or may obtain an VM image directed to similar software. For example, the scheduler 185 may be adapted to obtain a VM image based on the same OS but a different version(s) of the targeted application(s). Alternatively, the scheduler 185 may be adapted to obtain the same OS (e.g. Windows® OS 7) along with an application different from the targeted application but having similar functionality. As another alternative, the scheduler 185 may receive a different OS image that supports similar functionality.

In another embodiment of the disclosure, the heuristic engine 170 may determine the software profile information from the data traffic by receiving and analyzing the content from the network interface 160. For instance, according to one embodiment of the disclosure, it is contemplated that the heuristic engine 170 may be adapted to transmit the metadata identifying the client device 150 to the analysis engine 180, where such metadata is used to identify a desired software profile. The heuristic engine 170 may then transmit the software profile information to a scheduler 185 in lieu of such information being provided from control logic 182 within the analysis engine 180.

Alternatively, the control logic 182 may be adapted to receive one or more data packets of a data flow from the heuristic engine 170 and analyze the one or more data packets to identify the software profile without pre-processing by heuristic engine 170. In yet other embodiment of the disclosure, the scheduler 185 may be adapted to receive software profile information, in the form of metadata or data packets, from the network interface 160 or from the heuristic engine 170 directly.

The storage device 190 may be configured to store one or more VM disk files forming a VM profile database 194, where each VM disk file is directed to a different software profile for a VM. In one example, the VM profile database 194 may store a plurality of VM disk files having VM images for multiple software profiles in order to provide the collective capability for simulating the performance of a wide variety of client device(s) 150.

The analysis engine 180 is adapted to execute multiple VMs concurrently to support different VM operating environments that simulate the receipt and/or processing of different data flows of "suspicious" content by different network devices. Furthermore, the analysis engine 180 analyzes the effects of such content during processing. The analysis engine 180 may identify exploits by detecting undesired behavior caused by simulated processing of the suspicious content as carried out by the VM. This undesired behavior may include numerous repeated functions calls, repeated Sleep calls, and other behavior to stall or delay execution of code associated with the incoming content.

The analysis engine 180 may flag the suspicious content as malware according to observed undesired behavior of the VM. Different types of behaviors may be weighted based on the likelihood of system compromise, where suspicious content is determined when the weighted value exceeds a certain threshold.

Of course, it is contemplated that, for deeper analysis to detect exploits, such operations may be conducted within the cloud 165 in lieu of or in addition to operations performed within analysis engine 180.

The reporting module 195 may issue alert messages indicating the presence of one or more exploits to one or more hardware processors executing outside the VM environments, and may use pointers and other reference information to identify what message(s) (e.g. packet(s)) of the suspicious content may contain the exploit(s). Additionally, the server device(s) 140 may be added to a list of malicious network content providers, and future network transmissions originating from the server device(s) 140 may be blocked from reaching their intended destinations, e.g., by firewall 155.

Figure 3:
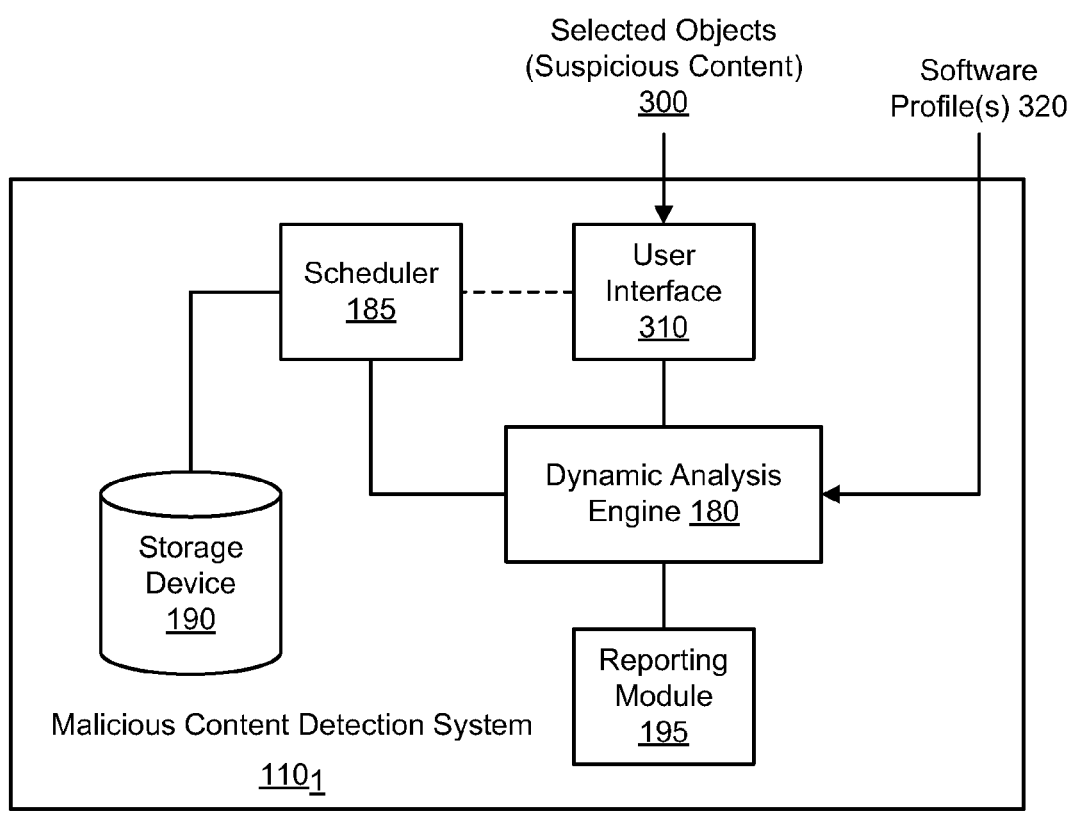
FIG. 3 is a second exemplary block diagram of the MCD system of FIG. 1.

Referring now to FIG. 3, a second exemplary embodiment of MCD system $110_1$ set forth in FIG. 1 is shown, where the software profile for VM instantiation is not determined through analysis of suspicious content (e.g. metadata, data packets, binary, etc.) by the network interface 160, heuristic engine 170, or analysis engine 180. Rather, this software profile directed to software under test is uploaded by the user and/or network administrator.

More specifically, a user interface 310 allows the user or network administrator (hereinafter referred to as "user/administrator") to introduce objects 300 of the suspicious content in accordance with one or more prescribed software profiles 320. The prescribed software profile(s) 320 may be preloaded or selected by the user/administrator in order to instantiate one or more VMs based on operations of the scheduler 185 and storage device 190 as described above. The VMs perform dynamic analysis of the objects 300 to monitor for undesired behavior during virtual processing of these objects 300 within the VMs.

Figure 4:
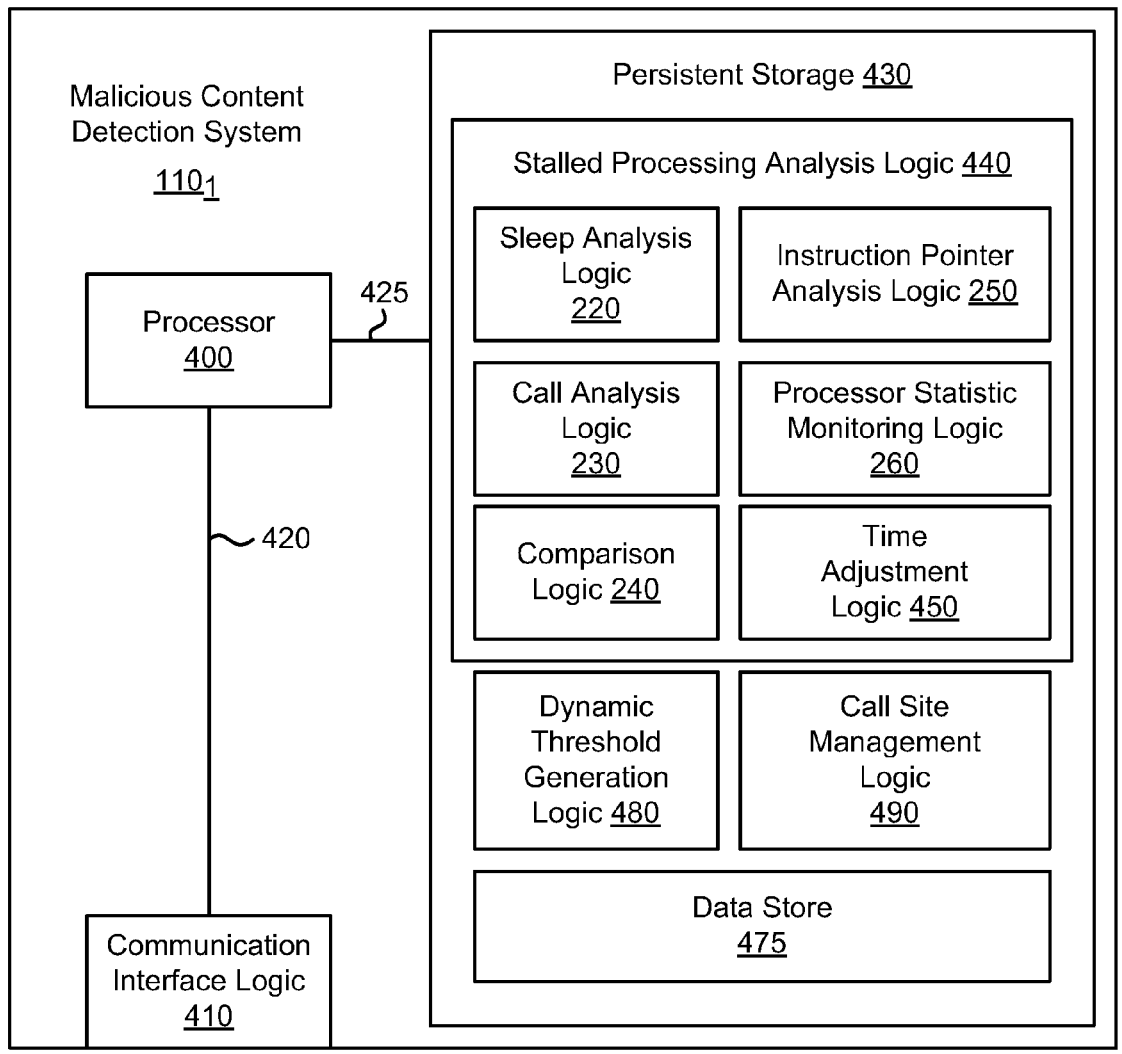
FIG. 4 is a detailed exemplary block diagram of components within the hardware architecture of the MCD system of FIG. 1.

Referring now to FIG. 4, an exemplary block diagram of logic that is implemented within MCD system $110_1$ is shown. MCD system $110_1$ comprises one or more processors 400 that are coupled to communication interface logic 410 via a first transmission medium 420. Communication interface logic 410 enables communications with MCD systems $110_2$-$110_N$ of FIG. 1 as well as other electronic devices over private and/or public networks. According to one embodiment of the disclosure, communication interface logic 410 may be implemented as a physical interface including one or more ports for wired connectors. Additionally, or in the alternative, communication interface logic 410 may be implemented with one or more radio units for supporting wireless communications with other electronic devices.

Processor 400 is further coupled to persistent storage 430 via transmission medium 425. According to one embodiment of the disclosure, persistent storage 430 may include stalled processing analysis logic 440 and a data store 475. In general, stalled processing analysis logic 440 is configured to monitor and alter operating parameters for one or more VM-based analysis environments in order to improve reliability in detecting time-bomb malware. The results of the analysis are stored within data store 475.

More specifically, stalled processing analysis logic 440 comprises sleep analysis logic 220, call analysis logic 230, comparison logic 240, time adjustment logic 450, instruction pointer analysis logic 250, and processor statistic monitoring logic 260. Herein, both sleep analysis logic 220 and call analysis logic 230 are configured to address an event where a series of successive Sleep function calls are used to stall processing of the incoming content. As an example, sleep analysis logic 220 may be configured to monitor the number of Sleep calls, the Sleep intervals and the cumulative Sleep time. The call analysis logic 230 may be configured to perform the same general functionality in monitoring the number of function calls made globally or to a particular call site as well as the cumulative delay incurred by initiation of function calls.

Optionally working in concert with sleep analysis logic 220 and call analysis logic 230, the time adjustment logic 450 is configured to alter the time interval returned back to the content running in the VM-based analysis environment (e.g., environment $200_1$). This alteration is performed in order to accelerate the time-bomb malware activity such that "suspicious" behavior can be detected. This is achieved through a shortened time interval while executing successive Sleep calls and/or other types of calls used when processing the content.

More specifically, sleep analysis logic 220 is configured with one or more counters that are used to count the number of Sleep request messages initiated by the content under analysis for subsequent comparison, using comparison logic 240 (e.g. one or more comparators) of the count value with a first threshold value stored in data store 475.

Additionally, the sleep analysis logic 220 may be further configured with one or more counters that are used to compute the cumulative amount of time (e.g. in units of time, clock cycles, etc.) in which the content under analysis would have placed a targeted electronic device into a Sleep state. The cumulative amount of time is subsequently compared, using comparison logic 240, to a second threshold value that is different than the first threshold value. The second threshold value may be set to a time value less than the average amount of time permitted for analysis of the content within a VM-based analysis environment $210_1$. The content under analysis is considered to be associated with time-bomb malware if the first and/or second thresholds are exceeded.

Call analysis logic 230 is configured with one or more counters that are used to count the number of function calls initiated by the content under analysis, which is subsequently compared with a third threshold value stored in data store 475 using comparison logic 240. The number of function calls may be based on either (i) a global basis (e.g., total number of function calls) or (ii) a per call site basis (e.g. per each caller address). It is contemplated that the third threshold value may differ from the first and second threshold values, and the value may be based at least in part on the type of function call. For instance, the GetLocalTime function call may be analyzed with greater scrutiny as this API function call tends to be a common choice for repetitive call type of evasion. Other such APIs may include SystemTimeToFileTime, GetSystemTime, Process32First, NtYieldExecution, NtDelayExecution, SleepEx, and different Wait variants (e.g., MsgWaitForMultipleObjects, WaitForSingleObject, etc.).

Call analysis logic 230 may be further configured with one or more counters that are used to monitor the cumulative amount of time that the called functions would need for execution of the called function. Using comparison logic 240, the cumulative amount of time is subsequently compared to a fourth threshold value stored in data store 475. The content under analysis is associated with time-bomb malware if the third and/or fourth thresholds are exceeded.

Call analysis logic 230 also has the ability to report the calling module name (EXE/DLL) based on call site addresses. This allows the reporting module (195) to assign weights intelligently (e.g. less weight when a call site is from system module and higher weight when a call site is from the content under analysis).

As further shown in FIG. 4, time adjustment logic 450 is configured to operate in concert with sleep analysis logic 220 and/or call analysis logic 230 in order to compute a shortened time to be used in Sleep so that malware is forced to perform malicious activity within the VM analysis time duration.

The instruction pointer analysis logic 250 is configured to periodically check, during processing of the content under analysis, whether the instruction pointer has remained within one or more prescribed address range(s) over a prolonged period of time. This check is conducted in order to determine if the content includes time-bomb malware adapted to perform an instruction-based loop to evade analysis within the VM-based environment. If the instruction pointer analysis logic 250 determines that the instruction pointer continues to remain within a particular address range, the processor utilization measured by processor statistic monitoring logic 260 is greater than a prescribed value, and no other exploits have been detected, the instruction pointer analysis logic 250 determines that the content under analysis is associated with time-bomb malware.

According to one embodiment of the disclosure, at least the sleep analysis logic 220, call analysis logic 230 and time adjustment logic 450 are implemented as part of the VM. The comparison logic 240, instruction pointer analysis logic 250 and processor statistic monitoring logic 260 may be placed within the VM or outside the VM.

As additional counter measures to time-bomb malware, persistent storage 430 may include dynamic threshold generation logic 480 and/or call site management logic 490. Dynamic threshold generation logic 480 comprises logic that dynamically alters the threshold values utilized by the sleep analysis logic 220 and call analysis logic 230. The dynamic nature of the threshold values prevents malware writers from altering malware to circumvent established thresholds, if such thresholds are discovered.

Another optional logic implemented within MCD system 110₁ is the call site management logic 490. The call site management logic 490 is configured to maintain a finite number of call sites as part of a table. If the table is full and a request for a new call site is made, the call site management logic 490 determines if the new call site is associated with a larger processing time requirement than another call site within the table. If so, the new call site is substituted for that call site. If not, the new call site is not placed within the table. However, cumulative threshold is updated accordingly.

III. Time-Bomb Malware Detection Operations

Figure 5:
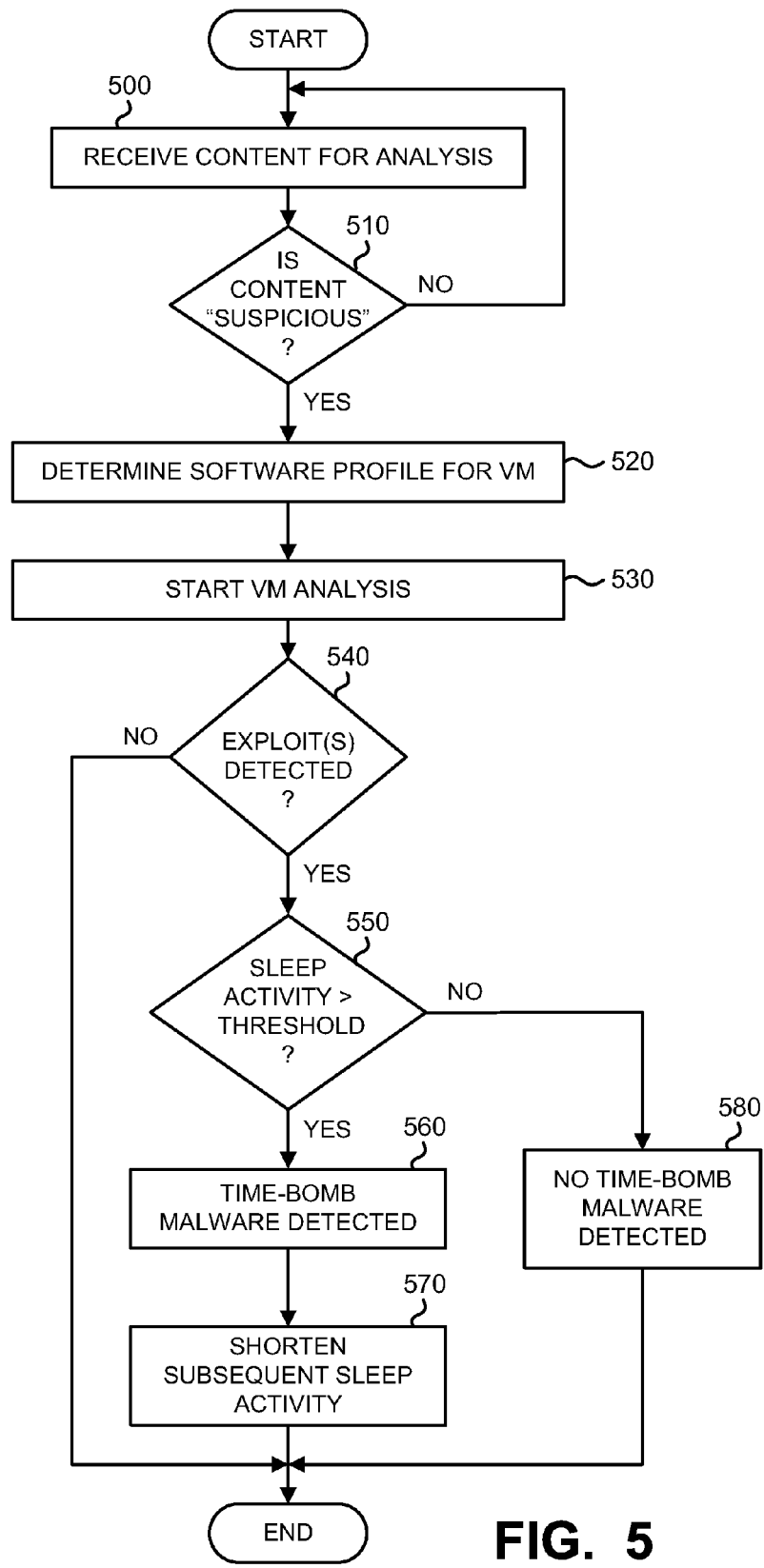
FIG. 5 is an exemplary embodiment of a flowchart illustrating operations for monitoring sleep operations conducted within the VM-based analysis environment of FIG. 2.

Referring to FIG. 5, a first exemplary flowchart outlining the operations for time-bomb malware detection is shown. Upon receiving content, a determination is made as to whether the content is "suspicious," namely whether analysis of the content indicates the presence of an exploit (blocks 500 and 510). Where the content is determined to be "suspicious," the attributes of the content may be used to determine one or more software profiles (block 520). VMs within the analysis environment are based on these software profile(s).

Thereafter, the VM(s) perform operations on the suspicious content and analyzes the results of these operations to determine if any exploits are present (block 530). These operations may include Sleep analysis, Call analysis and profiling (e.g. processor utilization, addressing analysis, etc.) as described above. If no exploits are detected, no further time-bomb analysis is needed (block 540).

Otherwise, according to one embodiment of the disclosure, one or more counters are initiated during run-time of the content under analysis. The counter(s) may monitor (i) the number of Sleep request messages, (ii) the Sleep interval requested and/or (iii) the cumulative Sleep time (herein generally referred to as "Sleep activity"). Where the Sleep activity exceeds a prescribe threshold, a determination is made that the content under analysis includes time-bomb malware (blocks 550 and 560). As a result, the sleep analysis logic is adapted to emulate compliance with requested Sleep calls, where actual duration of the request Sleep time(s) is shortened by the time adjustment logic, in some cases significantly shortened 80%, 90% or more for the allocated sleep time (block 570). Such shortening of the Sleep time, which is unbeknownst to the content under analysis, alters the processing time frame for the VM environment and allows the VM to monitor and report the particulars behind the time-bomb malware attack. If the Sleep activity remains below the prescribed threshold, the VM continues to operate as normal (block 580).

Figure 6:
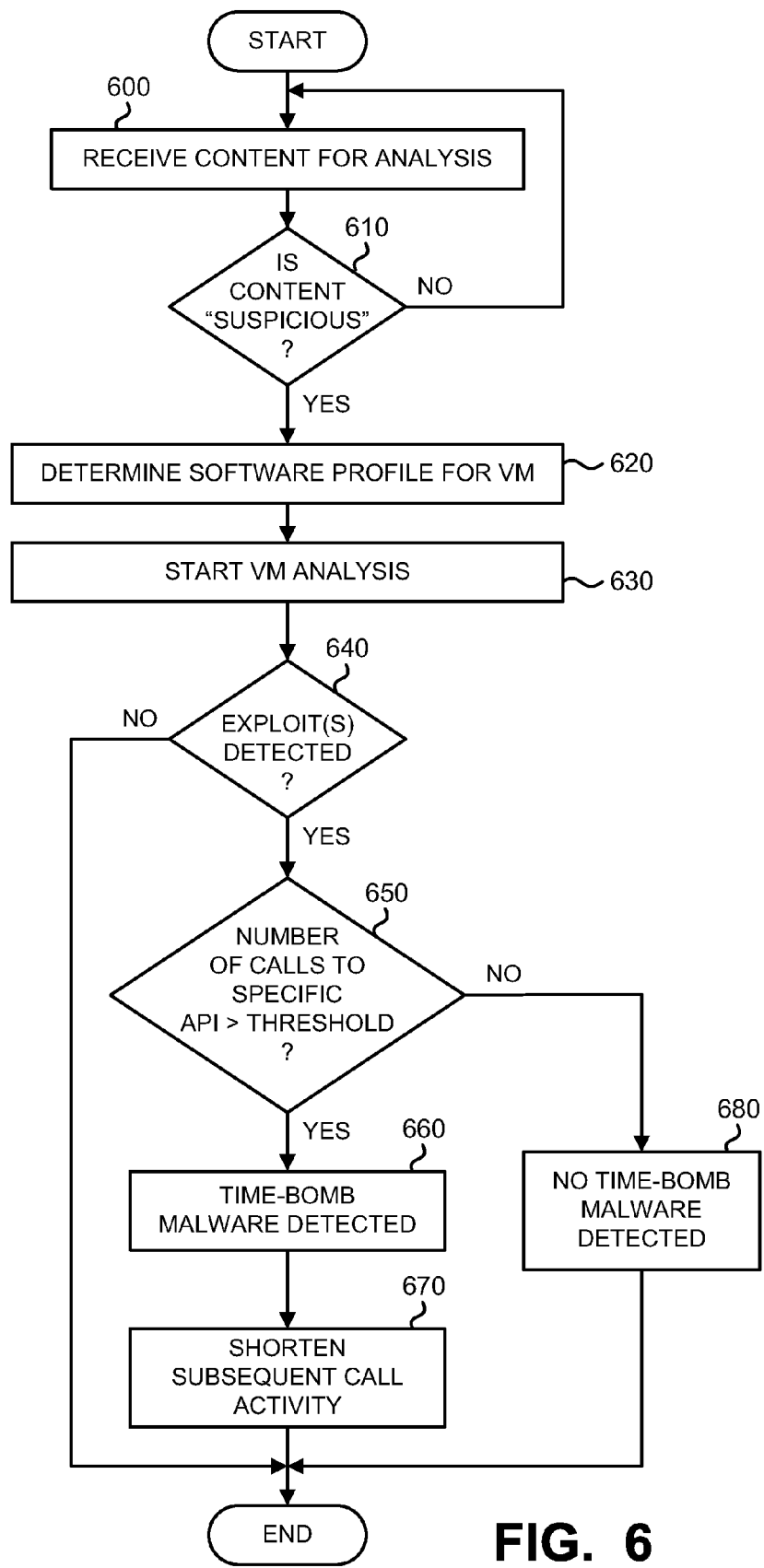
FIG. 6 is an exemplary embodiment of a flowchart illustrating operations in monitoring call operations conducted within the VM-based analysis environment of FIG. 2.

Referring now to FIG. 6, a second exemplary flowchart outlining the operations for time-bomb malware detection is shown. Similarly, upon receiving content, a determination is made as to whether the content is "suspicious" based on a potential presence of an exploit (blocks 600 and 610). Where the content is determined to be "suspicious," the attributes of the content may be used to determine one or more software profiles, where the VMs within the analysis environment are based on these software profile(s) (block 620).

Thereafter, the VM(s) perform operations on the suspicious content and analyzes the results of these operations to determine if any exploits are present (block 630). If no exploits are detected, no further time-bomb analysis is needed (block 640).

Otherwise, according to one embodiment of the disclosure, one or more counters are initiated during run-time of the content under analysis. The counter(s) may monitor the number of repeated function calls to a particular API. Where the number of function calls exceeds a prescribe threshold, a determination is made that the content under analysis includes time-bomb malware (blocks 650 and 660). As a result, the call analysis logic is adapted to emulate compliance with requested function calls by responding to these function calls, sometimes with a shortened call response wait time (block 670). Such shortened response time, which is unbeknownst to the content under analysis, alters the processing time frame for the VM environment to allow the VM to monitor and report the particulars behind the time-bomb malware attack. If the number of function calls to a particular API does not exceed a prescribed threshold, the VM will continue to operate as normal (block 680).

Figure 7:
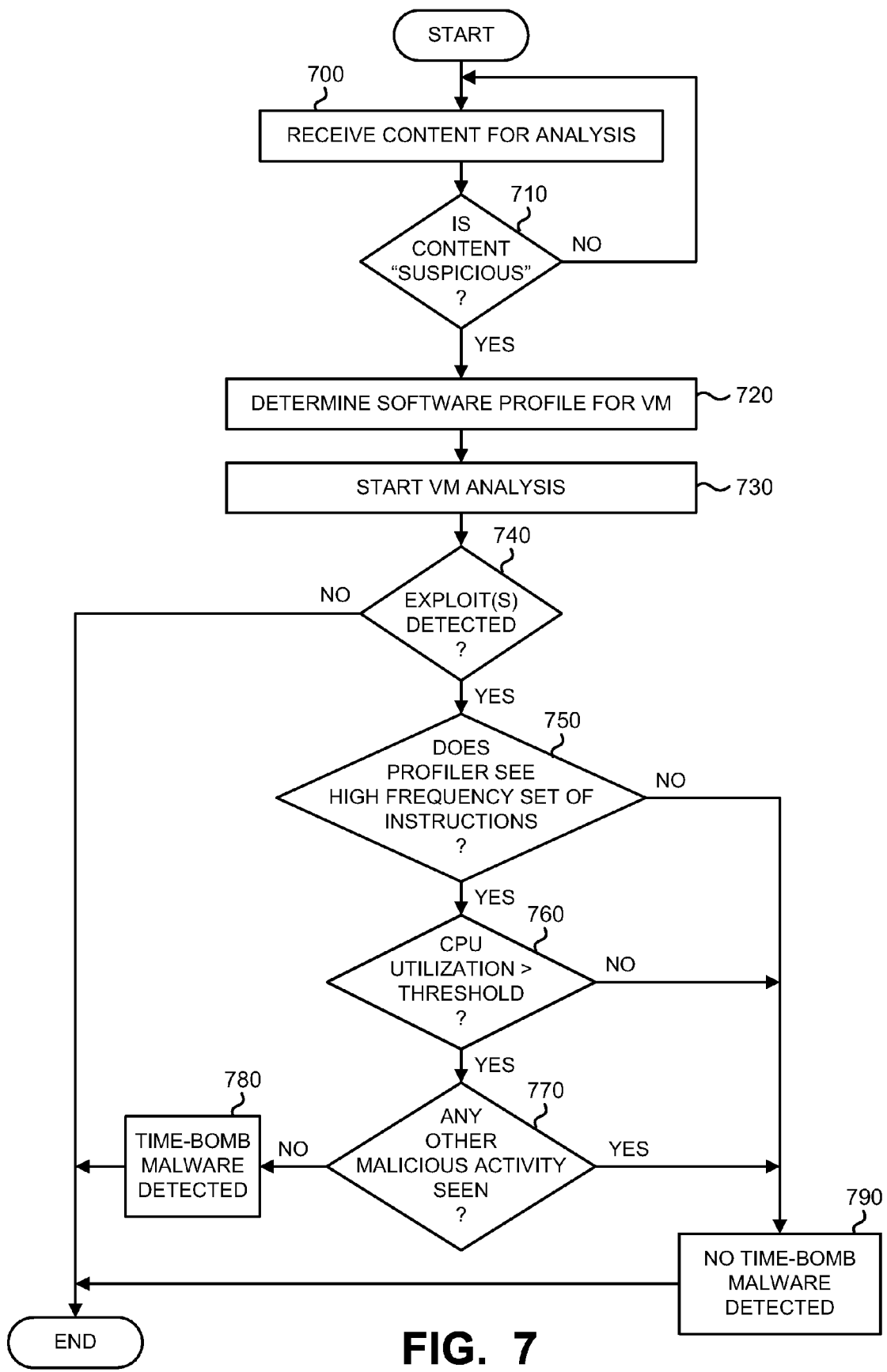
FIG. 7 is an exemplary embodiment of a flowchart illustrating operations in monitoring an instruction profile associated with operation conducted within the VM-based analysis environment of FIG. 2.

Referring to FIG. 7, a third exemplary flowchart outlining the operations for time-bomb malware detection is shown. Upon receiving content, a determination is made as to whether the content is "suspicious" based on a potential presence of an exploit (blocks 700 and 710). Where the content is determined to be "suspicious," the attributes of the content may be used to determine one or more software profiles, where the VMs within the analysis environment are based on these software profile(s) (block 720).

Thereafter, the VM(s) perform operations on the suspicious content and analyzes the results of these operations to determine if any exploits are present (block 730). If no exploits are detected, no further time-bomb analysis is needed (block 740).

Otherwise, according to one embodiment of the disclosure, the instruction pointer analysis logic (profiler) undergoes operations to determine if the instruction pointer utilized during processing of the content under analysis is frequently located into the same memory address or a particular range of memory addresses (block 750). If not, no time-bomb malware is detected by the VM operating within the analysis environment of the analysis engine.

In the event that the profiler detects continued presence of the instruction pointer as described above, a determination is made by the processor statistics monitoring logic profile if processor utilization is greater than a prescribed operating threshold (blocks 760-770). If so, and no other malicious activity is detected, a determination is made that the content under analysis includes time-bomb malware (block 780). If the processor utilization is below the prescribed threshold or other malicious activity is seen, then no time-bomb malware is detected. Hence, the VM will continue to operate as normal (block 790).

In the foregoing description, the invention is described with reference to specific exemplary embodiments thereof. It will, however, be evident that various modifications and changes may be made thereto without departing from the broader spirit and scope of the invention as set forth in the appended claims.

What is claimed is:

1. A system comprising:
an addressable memory; and
one or more hardware processors communicatively coupled to the addressable memory, the one or more hardware processors being configured to instantiate one or more virtual machines that are adapted to analyze received content that has been identified as suspicious by the content having a level of likelihood that at least one characteristic identified during inspection of the content indicates a potential presence of malware, the one or more virtual machines being configured to (i) monitor a delay caused by one or more events including, during processing of the suspicious content, an instruction pointer remaining at a specific address in the addressable memory or within a specific address range in the addressable memory that is less than an entire address range-and (ii) determine the suspicious content includes malware when the delay corresponding to the instruction pointer remaining at the specific address or within the specific address range exceeds a first time period.

2. The system of claim 1, wherein the one or more virtual machines being configured to further monitor time intervals for one or more Sleep request messages initiated during processing of the suspicious content and identifying the suspicious content as including malware if a combined delay for the one or more Sleep request messages exceeds the first time period.

3. The system of claim 1, wherein the one or more virtual machines being configured to further monitor time intervals for one or more Sleep request messages initiated during processing of the suspicious content and identifying the suspicious content as including malware if one of the time intervals exceeds the first time period.

4. The system of claim 1, wherein the one or more virtual machines being configured to further monitor the one or more events being a number of function calls initiated during processing of the suspicious content represented by a value contained in one or more counters accessible to the one or more virtual machines and identifying the suspicious content as including malware if the number of function calls exceeds a threshold value in response to a comparison conducted by comparison logic being processed by the one or more hardware processors.

5. A system comprising:
an addressable memory; and
one or more hardware processors communicatively coupled to the addressable memory, the one or more hardware processors being configured to instantiate one or more virtual machines that are adapted to analyze received content, the one or more virtual machines being configured to (i) monitor a delay caused by one or more events including, during processing of the content, an instruction pointer remaining at a specific address in the addressable memory or within a specific address range in the addressable memory that is less than an entire address range-and (ii) determine the content includes malware when the delay corresponding to the instruction pointer remaining at the specific address or within the specific address range exceeds a first time period and a level of utilization for the one or more hardware processors is greater than a prescribed operating threshold.

6. The system of claim 1, wherein the one or more virtual machines being configured to further maintain and monitor values of time intervals for Sleep calls per call site, initiated during processing of the suspicious content and identifying the suspicious content as including malware if one of the time intervals exceeds a predetermined time period.

7. The system of claim 1, wherein the one or more virtual machines being configured to further maintain and monitor values of call counters for certain functions per call site, initiated during processing of the suspicious content, and identifying the suspicious content as including malware if one of the call counters exceeds the a predetermined count threshold.

8. The system of claim 1 further comprising a reporting module being configured to differentiate call sites based on module names and assign weights accordingly and identifying the suspicious content as including malware if a higher count is associated with a call site residing in the suspicious content under analysis.

9. The system of claim 1 further comprising a heuristic engine being configured to identify delay hotspots and identifying the suspicious content as including malware if one of a plurality of time intervals associated with the delay exceeds a predetermined time period.

10. The system of claim 1, wherein the one or more hardware processors being further configured to process a reporting module that issues an alert message indicating the presence of malware within the suspicious content.

11. The system of claim 1, wherein the one or more virtual machines being configured to determine the content includes malware when the delay corresponding to the instruction pointer remaining at the specific address or within the specific address range exceeds the first time period and no other malicious activity associated with the suspicious content has been detected by the one or more virtual machines.

12. The system of claim 5, wherein the first time period has a duration that is dynamically set.

13. The system of claim 5, wherein the one or more virtual machines being configured to determine the content includes malware when the delay corresponding to the instruction pointer remaining at the specific address or within the specific address range exceeds the first time period, the level of utilization for the one or more hardware processors is greater than the prescribed operating threshold, and no other malicious activity associated with the suspicious content has been detected by the one or more virtual machines.

14. A system comprising:
one or more hardware processors;
a memory communicatively coupled to the one or more hardware processors, wherein the one or more hardware processors being configured to instantiate one or more virtual machines that are adapted to analyze received content that has been identified as suspicious by having a level of likelihood that at least one characteristic identified during prior inspection of the content indicates a potential presence of malware and the one or more virtual machines determine if the content includes time-bomb malware by monitoring, during processing of the received content within the one or more virtual machines, whether an instruction pointer is being repeatedly directed to a specific address or a specific address range that is less than an entire address space, and identifying the content as including malware when the instruction pointer is repeatedly directed to the specific address or the specific address range.

15. The system of claim 14, wherein the one or more virtual machines being configured to monitor time intervals for one type of event being one or more Sleep request messages initiated during processing of the received content and identifying the content as including malware if a total delay requested by the one or more Sleep request messages exceeds the second threshold being a first predetermined time period.

16. The system of claim 14, wherein the one or more virtual machines being configured to monitor time intervals for one type of event being one or more Sleep request messages initiated during processing of the content and identifying the content as including malware if one of the time intervals exceeds a first predetermined time period.

17. The system of claim 14, wherein the one or more virtual machines being configured to further monitor the number of events being a number of function calls initiated during processing of the content and identifying the content as including malware if the number of function calls exceeds the first threshold.

18. The system of claim 14, wherein the second threshold has a duration that is dynamically set.

19. The system of claim 14, wherein the one or more virtual machines being configured to maintain and monitor time intervals for Sleep calls per call site, initiated during processing of the content and identifying the content as including malware if one of the time intervals exceeds a predetermined time period.

20. The system of claim 14, wherein the memory further comprises a reporting module being configured to differentiate call sites based on module names and assign weights accordingly and identifying the content.

* * * * *